United States Patent [19]
Lyman

[11] 3,965,571
[45] June 29, 1976

[54] FLEXIBLE SPIRALLY WOUND CONDUIT CUTTING DEVICE

[76] Inventor: Richard G. Lyman, 408 E. 230th St., Carson, Calif.

[22] Filed: June 30, 1975

[21] Appl. No.: 591,778

[52] U.S. Cl. .................................. 30/90.2; 30/92
[51] Int. Cl.² .................... B21F 11/00; B26B 27/00
[58] Field of Search ............... 30/90.1, 90.2, 90.3, 30/90.6, 90.7, 91.2, 92

[56] References Cited
UNITED STATES PATENTS

| | | | |
|---|---|---|---|
| 1,111,388 | 9/1914 | Johnson | 30/90.2 |
| 1,205,125 | 11/1916 | Dies | 30/92 |
| 1,471,593 | 10/1923 | Davis | 30/90.2 |
| 1,767,342 | 6/1930 | Blake | 30/90.2 |
| 1,775,335 | 9/1930 | Wiggins | 30/90.2 |
| 2,031,470 | 2/1936 | Eck et al. | 30/90.3 |
| 2,342,322 | 2/1944 | Ailstock | 30/990.2 |
| 3,284,895 | 11/1966 | Selander et al. | 30/90.2 |
| 3,822,471 | 7/1974 | Crowl | 30/92 |

Primary Examiner—Othell M. Simpson
Assistant Examiner—J.T. Zatarga
Attorney, Agent, or Firm—William C. Babcock

[57] ABSTRACT

A compact light weight device that when gripped by one hand of a user holds a section of spirally wound conduit in a non-longitudinally movable position therein, and the device including a guide for a hack saw blade whereby said conduit may be cut normal to the longitudinal axis thereof.

2 Claims, 4 Drawing Figures

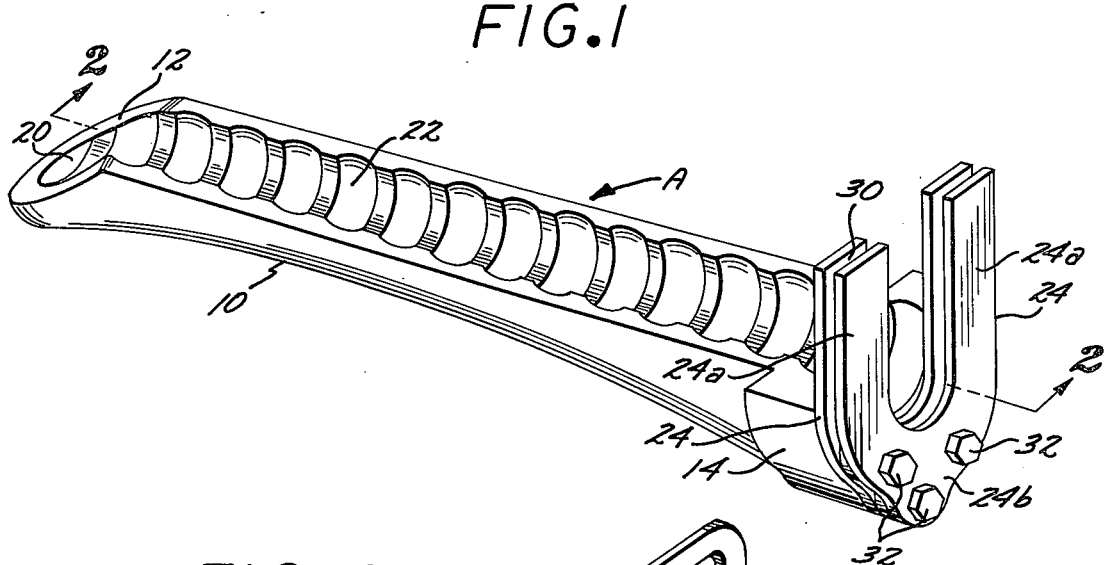
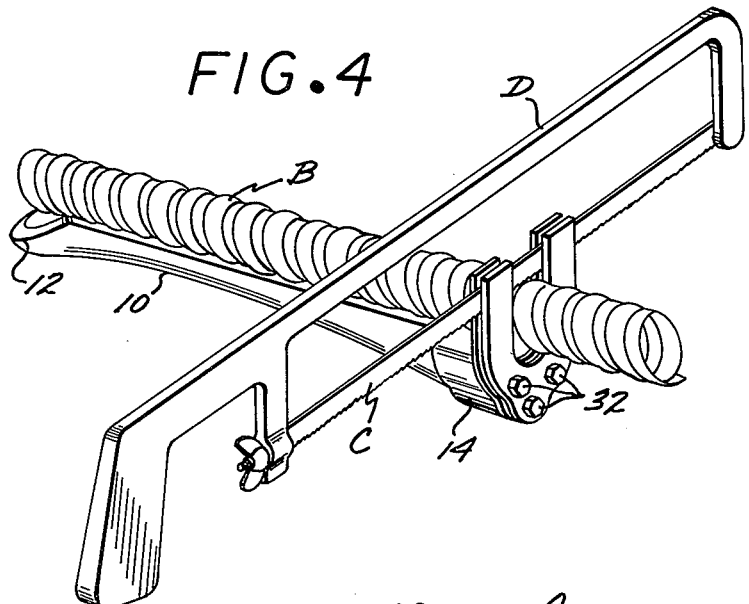
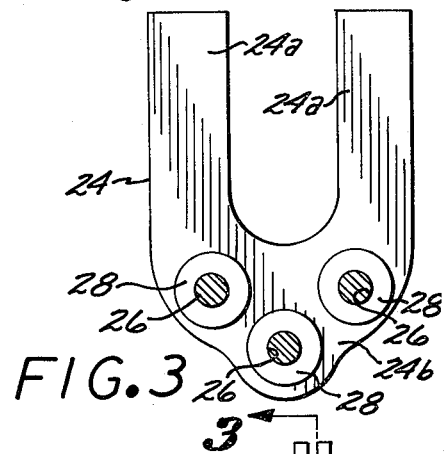
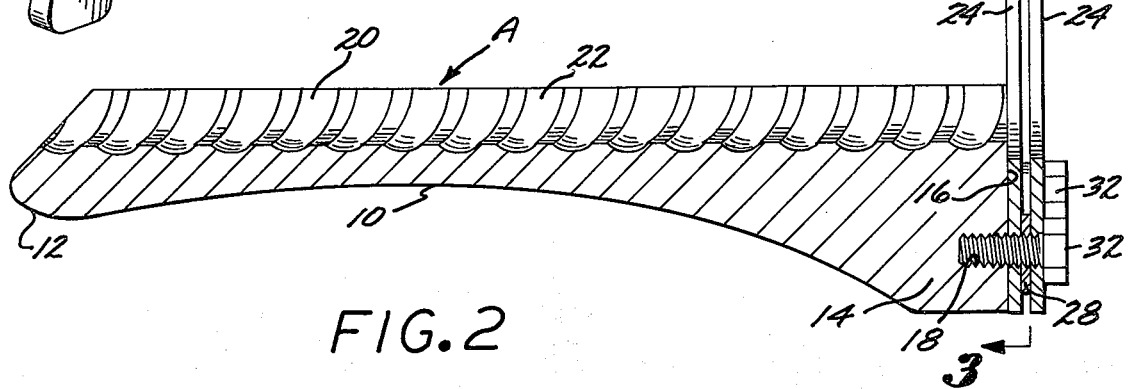

3,965,571

FLEXIBLE SPIRALLY WOUND CONDUIT CUTTING DEVICE

BACKGROUND OF THE INVENTION

1. Field of the Invention

Flexible spirally wound conduit cutting device.

2. Description of the Prior Art

In the past, various types of devices have been devised and use for cutting conduit. The majority of such devices are heavy, are of a complicated mechanical structure, and are primarily adapted for use on a work bench.

A primary object in devising the present invention is to supply a conduit cutting device that is compact, light in weight, may be used by an electrician in an elevated position to cut conduit, and one that may be easily carried in the pocket of the electrician or suspended from his belt when not in use.

Another object of the present invention is to supply a conduit cutting device that is particularly adapted for spirally wound conduit, and one that when used assures the cut made in the conduit will be normal to the longitudinal axis thereof.

A still further object of the invention is to supply a conduit cutting device that will permit electricians to comply with recently enacted legislation in many communities, in which it is required that all conduit be cut normal to a longitudinal axis thereof, to assure that full contact may be made with a flex connector to provide a better ground.

SUMMARY OF THE INVENTION

The present invention includes an elongate handle that has a first rearward end and a second forward end a substantially greater transverse cross section than the balance of the handle. The handle has an elongate cavity of substantially semi-circular cross section that extends the longitudinal length thereof, and the second forward end of the handle having a flat forward U-shaped face that is normally disposed to the handle. The second forward face has a number of spaced tapped bores extending rearwardly therein below the bottom extremity of the cavity. The cavity includes a number of longitudinally spaced transverse recesses defined therein that engage the exterior surface of the spirally wound conduit when a length thereof is rested in the handle, and the recesses preventing the conduit moving longitudinally relative to the handle during the time that the conduit is being cut. First and second rigid U-shape guide plates are provided each of which plates include two transversely spaced legs that have free first ends and second ends that merge into a transverse web. Each of the plates has a number of openings in the web that are axially alignable with the tapped bores. Spacer means are provided for separating the first and second plates to define a space therebetween of greater width than the thickness of a hacksaw blade that is used in cutting the conduit. The hacksaw blade so used is supported from a conventional hand saw frame. A number of bolts are provided that extend through the openings to engage the tapped bores to removably secure the first and second rigid plates and spacer means situated therebetween on the second end of the handle to permit a section of the spirally wound conduit resting in the cavity of the handle to be cut when the blade is reciprocated in the space between the guide plates and in sawing conduct with the conduit.

BRIEF DESCRIPTION OF THE DRAWINGS

FIG. 1 is a perspective view of the flexible conduit cutting device;

FIG. 2 is a longitudinal cross sectional view of the device taken on the line 2—2 of FIG. 1;

FIG. 3 is an end elevational view of the device taken on the line 3—3 of FIG. 2; and FIG. 4 is a perspective use of the device supporting a section of spirally wound conduit in such a manner that a hacksaw blade supported in a conventional saw frame may be reciprocated between guide plates of the device to cut the conduit normal to the longitudinal axis thereof.

DESCRIPTION OF THE PREFERRED EMBODIMENT

The conduit cutting device A as best seen in FIGS. 1 and 4 is adapted to have a length of spirally wound conduit B removably disposed therein, and when the conduit is so disposed a hacksaw blade C supported on a conventional saw frame D may be used to cut the conduit normal to the longitudinal axis thereof.

The conduit cutting device A as shown in FIGS. 1 and 2 includes an elongate rigid handle 10 that has a first rearward end 12 and a second forward end 14, with the second forward end being of substantially greater transverse cross section than the balance of the handle. The second forward end 14 defines a forwardly disposed flat face 16 that has a number of spaced tapped bores 18 extending rearwardly therefrom, with the tapped bores being situated below a longitudinal cavity 20 formed in the handle. The longitudinal cavity 20 has a number of longitudinally spaced transverse recesses 22 formed therein, with the spacing of the recesses being such that they may removably engage the exterior surface of the spirally wound conduit B and prevents the conduit sliding longitudinally relative to the handle, when the handle and the conduit are concurrently grasped by a hand of a user (not shown).

First and second identical U-shaped guide plates 24 are provided, with each guide plate including two parallel laterally spaced legs 24a that have first free ends and second ends that merge into a transverse web 24b. A number of spaced openings 26 are formed in web 24b and in such spacing that they are axially alignable with the tapped bores 18 formed in second forward end 14 of handle 10. Spacing means 28 are intermediately disposed between the first and second plates 24 as may be seen in FIG. 2 and serve to define a space 30 therebetween that is of greater width than the thickness of the saw blade C. A number of bolts 32 are provided that extend through the openings 26 and engage the tapped bores 18 to removably clamp the U-shaped plates 24 and spacing means 28 to the second end of the handle 10. The blade C when reciprocated in the transverse space 30 may be brought into sawing contact with the section of the spirally wound conduit B resting in the device, and the blade affecting a cut therethrough that is normal to the longitudinal axis of a conduit.

The conduit cutting device above-described is preferably formed from a light weight material, is compact and when not in use may be easily carried in the pocket of an electrician or suspended from the belt. The device is particularly adapted for use by an electrician when he is in an elevated position and must effect a cut in conduit. The spacing means 28, as may best be seen in FIG. 3, are washers that engage the bolts 32 and are intermediately disposed between the plates 24.

The use and operation of the invention has been explained previously in detail and need not be repeated.

I claim:

1. In combination with a hacksaw having a thin elongate blade, a light weight portable device that may be grasped by a hand of a user to removably hold a section of spiral wound flexible electric conduit within the confines thereof in such a position that said blade can be used to make a transverse cut in said conduit normal to the longitudinal axis of said conduit, said device including:
   a. an elongate handle that has a first rearward end and a second forward end of substantially greater transverse cross section than the balance of said handle, with said handle having an elongate cavity of substantially semi-circular cross section extending the longitudinal length thereof, with said second forward end having a flat forward U-shaped face normally disposed to the longitudinal axis of said handle, and said second forward end face having a plurality of spaced tapped bores extending rearwardly therein below the bottom extremity of said cavity, and said cavity having a plurality of longitudinally spaced transverse recesses defined therein that engage the exterior surface of said spirally wound conduit to prevent the latter moving longitudinally in said handle when said conduit is being cut by said blade;
   b. first and second rigid U-shaped guide plates, each of said guide plates including two transversely spaced legs having free first ends extending above said handle to a height above a conduit to be cut and second ends that merge below said cavity into a transverse web, and each of said plates having a plurality of openings in said web that are axially alignable with said tapped bores;
   c. spacer means for separating said first and second plates and defining a space therebetween of a width greater than the thickness of said blade; and
   d. a plurality of bolts that extend through said openings to engage said tapped bores to removably secure said first and second rigid plates and spacer means to said second end of said handle to permit a section of said spirally wound conduit resting in said handle to be cut when said blade is reciprocated in said space in sawing contact with said conduit.

2. A device as defined in claim 1 in which said spacer means are washers disposed between said first and second plates and through which said bolts extend.

* * * * *